United States Patent
Fu et al.

(10) Patent No.: US 10,174,601 B2
(45) Date of Patent: Jan. 8, 2019

(54) PERMEABLE CEMENT STONE FRACTURING EXPLOITATION METHOD FOR NON-CONVENTIONAL OIL AND GAS LAYER

(71) Applicants: Sichuan Xingzhi Zhihui Intellectual Property Operation Co., Ltd., Chengdu, Sichuan (CN); Rui Fu, Chengdu, Sichuan (CN)

(72) Inventors: Rui Fu, Sichuan (CN); Huiying Niu, Sichuan (CN); Wanchun Fu, Sichuan (CN)

(73) Assignees: Sichuan Xingzhi Zhihui Intellectual Property Operation Co., Ltd., Chengdu (CN); Rui Fu, Chengdu (CN)

( * ) Notice: Subject to any disclaimer, the term of this patent is extended or adjusted under 35 U.S.C. 154(b) by 0 days.

(21) Appl. No.: 15/550,858

(22) PCT Filed: May 11, 2016

(86) PCT No.: PCT/CN2016/081638
§ 371 (c)(1),
(2) Date: Aug. 14, 2017

(87) PCT Pub. No.: WO2017/028559
PCT Pub. Date: Feb. 23, 2017

(65) Prior Publication Data
US 2018/0238157 A1     Aug. 23, 2018

(30) Foreign Application Priority Data
Aug. 17, 2015   (CN) .......................... 2015 1 0500540

(51) Int. Cl.
*E21B 43/25*     (2006.01)
*E21B 43/26*     (2006.01)
*E21B 43/267*    (2006.01)
*E21B 43/02*     (2006.01)
*E21B 43/16*     (2006.01)

(52) U.S. Cl.
CPC .......... *E21B 43/261* (2013.01); *E21B 43/025* (2013.01); *E21B 43/164* (2013.01); *E21B 43/267* (2013.01); *E21B 43/168* (2013.01)

(58) Field of Classification Search
CPC .... E21B 43/261; E21B 43/025; E21B 43/164; E21B 43/267; E21B 43/168
USPC ....................................................... 166/259
See application file for complete search history.

(56) References Cited

U.S. PATENT DOCUMENTS 9,334,720 B2 *   5/2016   Burnette ............... E21B 43/267

\* cited by examiner

*Primary Examiner* — Silvana C Runyan
(74) *Attorney, Agent, or Firm* — Chieh-Mei Wang

(57) ABSTRACT

A permeable cement stone fracturing exploitation method for non-conventional oil and gas layer comprising the following processes: transporting and storing a supercritical carbon dioxide to a well site; selecting, transporting, and storing an oil well cement and admixtures to the well site; mixing the oil well cement and the admixtures into a first mixture, forming a cement slurry; pumping the supercritical carbon dioxide and the cement slurry respectively into a high pressure mixer; automatically mixing the supercritical carbon dioxide and the cement slurry into a second mixture by the high pressure mixer; continuously on-line monitoring and temporarily storing the second mixture; and injecting the second mixture into the non-conventional oil and gas layer for fracturing to form a reticulate artificial fracture; the second mixture is automatically heated, pressure reduced, gasified, solidified, carbonic acid dissolved and eroded, leached to form the a permeable cement stone.

2 Claims, 2 Drawing Sheets

PERMEABLE CEMENT STONE FRACTURING EXPLOITATION METHOD FOR NON-CONVENTIONAL OIL AND GAS LAYER

FIELD OF THE INVENTION

The present invention relates to oil and gas mining process, more particularly to a permeable cement stone fracturing exploitation method for non-conventional oil and gas layer.

BACKGROUND OF THE INVENTION

According the research studies of the inventors, conventional fracturing stimulation method that is identical or similar to that used in conventional oil and gas layers is commonly used for non-conventional oil and gas layers, such as tight oil and gas, shale gas, and coal-bed methane. The conventional fracturing stimulation method uses large-scale water-base fluid with proppant, therefore mainly having the following problems:

1. A large amount of fracturing fluid having poor compatibility with the strata is needed and tends to pollute the strata. Large amount of flow-back fluid with complex composition is left after fracturing, and detoxification of the disposal is very difficult and expensive, resulting in pollution of the environment.

2. The stimulation of oil and gas is poor. In conventional fracturing, there is only point contact between the fracture surface and the spherical ceramic proppant, which is easily crushed and embedded into the soft strata, resulting in short effective duration of stimulation. Moreover, as the proppants are separated from each other, small particles in the proppants tend to move and flow back, causing complex and dangerous issues such as blocking and abrading the pipeline system laid on the ground, under the ground and at the wellhead.

3. Large hydraulic horsepower is needed. For example, in a horizontal shale gas well with a vertical depth of 3000 meters and a horizontal length of 1000 meters, over 20,000 HHP of hydraulic horsepower is needed for the fracturing trucks in conventional staged fracturing operations.

4. Large well site is needed. Lots of conventional fracturing equipments and accessorial equipments are used to transport and store materials for fracturing, oil, proppant, water, etc., thus occupying large well site.

5. High risk of environmental damage. The conventional fracturing uses large-scale water-based fluid and proppant producing a mass of flow-back fluid after fracturing, causing costly disposal detoxification and reuse of the flow-back fluid and serious pollution to the natural environments such as water, land air, and so on. The massive fracturing using water-based fluid for coal-bed methane or gas hydrate in the shallow strata would bring geological disasters, such as land collapse, landslide, earthquake, etc.

6. High cost of exploitation. Using conventional fracturing stimulation in non-conventional oil and gas layer has the disadvantages of needing large amount of fracturing fluid, large hydraulic horsepower, large well site, high environmental expenses, and short effective duration of stimulation, resulting in high cost of exploitation, therefore limiting rich non-conventional oil and gas to be mined in an effective, environmentally friendly and massive way. The rich non-conventional oil and gas include tight oil and gas, shale gas, coal-bed methane, gas hydrate and etc.

BRIEF SUMMARY OF THE INVENTION

The present invention relates to a new, effective, and environmental fracturing exploitation method for non-conventional oil and gas layer such as tight oil and gas, shale gas, coal-bed methane, gas hydrate and etc. In the fracturing exploitation method, a second mixture of supercritical carbon dioxide (SC—$CO_2$) and cement slurry of the oil well is injected into the reticulate artificial fracture and the natural fracture of the oil and gas layer to form permeable cement stone automatically, supporting and fixing the artificial fracture and the natural fracture of the oil and gas layer effectively, and connecting the wellbore and the oil and gas layer effectively. The use of this fracturing exploitation method achieves the goal of fracturing stimulation and mining in an effective and environmentally friendly way. The fracturing exploitation method mines oil and gas without the use of conventional proppant and conventional fracturing fluid, achieving the advantages of production of zero flow-back fluid, smaller amount of water, smaller amount of material, adopting smaller volume of equipment, smaller area of well site, lower cost, improved effect, more environmental benefit, and better adaptability.

The permeable cement stone fracturing exploitation method for non-conventional oil and gas layer mainly comprises the following complementary processes:

1. Transporting, storing and pumping process for the supercritical carbon dioxide: transporting the supercritical carbon dioxide (SC—$CO_2$) to the well site by using a specialized tanker truck or a pipeline; storing the supercritical carbon dioxide at the well site under a supercritical state with a pressure higher than 7.38 Mpa and a temperature lower than 31.05° C., thereafter pumping and transporting the supercritical carbon dioxide by using one or more supercritical carbon dioxide pumps;

2. Transporting, storing, preparing and pumping process for the fracturing cement slurry: selecting a preferred oil well cement and preferred admixtures compatible with a well depth, a well temperature, and a strata; adding the admixtures such as a coagulation controlling agent, a viscosity controlling agent, a resistance reducing agent, a filtrate reducing agent and the like to the oil well cement, wherein the coagulation controlling agent is used to control the coagulation time, the viscosity controlling agent is used to control the flow viscosity, the resistance reducing agent is used to reduce the flow friction; transporting the oil well cement with added admixtures to the well site and storing the oil well cement with added admixtures at the well site; mixing the oil well cement and the admixtures into a first mixture and pumping the first mixture by using one or more cement pumps;

3. Process for mixing the supercritical carbon dioxide and the cement slurry: pumping the supercritical carbon dioxide and the cement slurry respectively into a high pressure mixer at a proportion, a control temperature, and a pressure designed for a single well, automatically mixing the supercritical carbon dioxide and the cement slurry into a second mixture by the high pressure mixer; continuously on-line monitoring the second mixture by using a specialized equipment, recording and controlling the technical parameters of the second mixture, especially a porosity, a permeability and a strength of the cement stone, so that the technical parameters meet the design requirements, ensuring quality of the follow-up processes; thereafter, temporarily storing the second mixture into a high pressure insulated buffer tank; wherein the technical parameters include temperature, pressure, density and so on;

4. Process of fracturing the supercritical carbon dioxide and the cement slurry on a ground: controlling a temperature, an output volume, and a pump pressure according to a design of the single well; injecting qualified second mixture in the on-line monitoring into the non-conventional oil and gas layer under the ground for fracturing by using a plurality of fracturing pumps to form a reticulate artificial fracture;

5. Process of forming a permeable cement stone under the ground: the process of forming the permeable cement stone under the ground for the non-conventional oil and gas layer comprises four steps, as shown in FIG. 1. Step 1: mixing the supercritical carbon dioxide and the cement slurry-, and injecting the second mixture into the natural fracture and the artificial fracture of the non-conventional oil and gas layer; Step 2: the supercritical carbon dioxide is heated by automatic exchange according to temperatures of the strata and the cement slurry, so that the supercritical carbon dioxide is gasified into compressed small carbon dioxide bubbles gradually. Step 3: an internal pressure of the cement slurry automatically decreases when the cement slurry enters a state of weightlessness during initial setting, therefore causing the compressed small carbon dioxide bubbles to become large air pores rapidly. Step 4: after final setting and solidification of the cement slurry, a portion of the carbon dioxide dissolves in bound water and free water to form carbonic acid to erode, dissolve and leach the air pore and pore throat of the cement stone, so that the porosity and the permeability of the cement stone are further increased under the effect of the carbonic acid, the cement stones support the natural fracture and the artificial fracture effectively and connect the strata and the wellbore effectively, reaching the goals of improved production and efficiency and environmentally friendly mining.

As compared with the conventional fracturing process using water-based fluid and proppant, the permeable cement stone fracturing exploitation method for non-conventional oil and gas layer of the present invention mainly has the following technical, economical and environmental benefits:

1. Rising the level of technology and environmental protection: all cement slurry used in this permeable cement stone fracturing exploitation method for non-conventional oil and gas layer solidifies formation of artificial stones with pore spaces and fractures. The artificial stones provide very high effective permeability, support the natural fracture and the artificial fracture effectively and stabilize the soft, collapsible and sandy strata. The present invention can bring large stimulation and long effective duration of stimulation. All of the cement stone and most of the carbon dioxide are left in the strata and sealed underground, causing no proppant and flow-back fluid. The cement stone can prevent geological hazards, such as collapse of strata, sand influx, landslide, etc and would not pollute the environment such as air, surface water, underground water, land, etc., providing a high environmental protection level.

2. The amount of fracturing water is reduced greatly: using the permeable cement stone fracturing exploitation method in the present invention, 100 parts (by volume, containing 30-50% of water) of cement slurry and 25 parts (by volume) of supercritical carbon dioxide are needed to form an artificial support fracture with a volume N, while 100-150 parts (by volume) of ceramisite and 1000 parts (by volume; containing 90-98% of water) of fracturing fluid are need in the conventional fracturing method to form an artificial support fracture with the same volume N. The volume of water used in the present invention is 5% less than that used in the conventional fracturing method.

3. The pumping pressure of fracturing decreases greatly: the density of the cement slurry used in the permeable cement stone fracturing exploitation method in present invention is 1.85 $kg/cm^2$ to 1.95 $kg/cm^2$, 0.8 $kg/cm^2$ higher than the density of the conventional water-base fracturing fluid, which is 1.01 $kg/cm^2$ to 1.05 $kg/cm^2$. In a well with a depth of 3000 meters, the pumping pressure of fracturing can reduce at least 3000×0.8/100 Mpa=24 Mpa.

4. The number of equipments at the well site is reduced greatly: in the permeable cement stone fracturing exploitation method for non-conventional oil and gas layer of the present invention, the number of equipments used for transporting, storing, constructing, draining and sewage treating the fracturing water and other materials is reduced greatly, and the equipments occupy less space at the well site.

5. The cost for fracturing is reduced greatly: the permeable cement stone fracturing in the present invention needs no proppant, less water, less material such as cement, carbon dioxide, etc. The method in the present invention has the advantages of requiring lesser equipments for fracturing, smaller hydraulic horsepower, smaller area of well site, no flow-back fluid after fracturing, no pollutant emission, long effective duration of stimulation, reducing the cost of fracturing in the non-conventional oil and gas layer greatly.

DETAILED DESCRIPTION OF THE PREFERRED EMBODIMENTS

Figure 1:
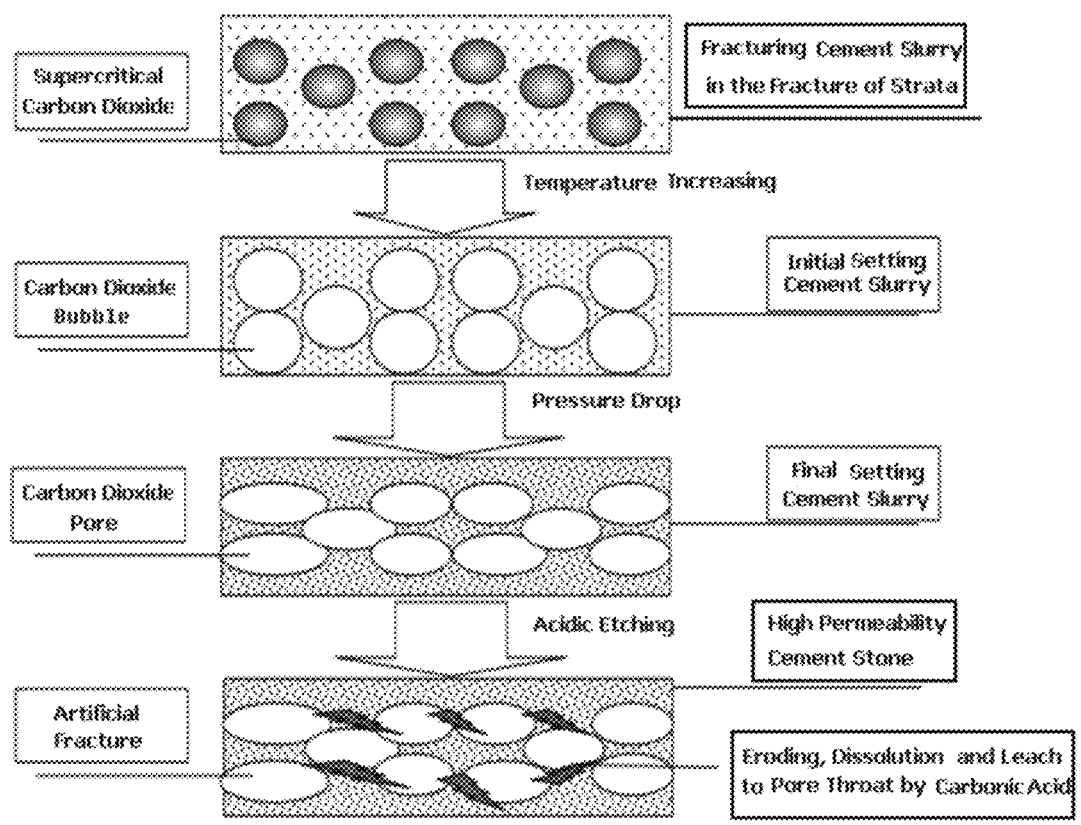
FIG. 1 is a schematic illustration of the process of forming permeable cement stone underground in the non-conventional oil and gas layer.

The present invention will now be described more specifically with reference to the following embodiments in combination with the drawings, but the present invention is not limited to the precise form disclosed.

In one embodiment, a permeable cement stone fracturing exploitation method for a non-conventional oil and gas layer comprises the following complementary processes:

1) transporting, storing and pumping process for supercritical carbon dioxide: transporting the supercritical carbon dioxide to a well site by using a specialized tanker truck or a pipeline; storing the supercritical carbon dioxide at the well site under a supercritical state with a pressure higher than 7.38 Mpa and a temperature lower than 31.05° C.; and pumping and transporting the supercritical carbon dioxide by using one or more supercritical carbon dioxide pumps; wherein a critical condition of the supercritical carbon dioxide comprises a pressure higher than 7.38 Mpa and a temperature lower than 31.05° C.

2) transporting, storing, preparing and pumping process for a fracturing cement slurry: selecting an oil well cement and an preferred admixtures compatible with a well depth, a well temperature, and a strata; transporting the oil well cement and the admixtures to the well site and storing the oil well cement and the admixtures at the well site; mixing the oil well cement and the admixtures into a first mixture and pumping the first mixture by using one or more pumps, wherein the admixtures include a coagulation controlling agent, a viscosity controlling agent, a resistance reducing agent, and a filtrate reducing agent;

3) process for mixing the supercritical carbon dioxide and the cement slurry: pumping the supercritical carbon dioxide and the cement slurry respectively into a high pressure mixer at a proportion designed for a single well; automatically mixing the supercritical carbon dioxide and the cement slurry into a second mixture by the high pressure mixer; and continuously on-line monitoring, recording and controlling technical parameters of the second mixture, especially a porosity, a permeability and a strength of the cement stone, so that the technical parameters meet design requirements for the single well to ensure quality of follow-up processes; and temporarily storing the second mixture;

4) process of fracturing the supercritical carbon dioxide and the cement slurry on a ground: controlling a temperature, an output volume, and a pump pressure according to a design of the single well; injecting the second mixture into the non-conventional oil and gas layer under the ground for fracturing by using a plurality of fracturing pumps to form a reticulate artificial fracture;

5) process of forming a permeable cement stone under the ground: the second mixture injected into a natural fracture and the artificial fracture of the non-conventional oil and gas layer is automatically heated, pressure reduced, gasified, solidified, carbonic acid dissolved and eroded, leached to form the permeable cement stone, comprising the following steps: injecting the second mixture into the artificial fracture and the natural fracture in the non-conventional oil and gas layer; wherein the supercritical carbon dioxide is heated by automatic heat exchange according to temperatures of the strata so that the supercritical carbon dioxide is gasified into compressed carbon dioxide bubbles; an internal pressure of the cement slurry automatically decreases when the cement slurry enters a state of weightlessness during initial setting, therefore causing the compressed carbon dioxide bubbles to become air pores; after final setting and solidification of the cement slurry, a portion of the carbon dioxide dissolves in bound water and free water to form carbonic acid to erode, dissolve and leach the pore and pore throat of the cement stone, so that the porosity and the permeability of the cement stone are further increased under the effect of the carbonic acid.

In another embodiment, the permeable cement stone fracturing exploitation method for a non-conventional oil and gas layer comprises the following complementary steps:

The first step: single injection of upfront supercritical carbon dioxide: after finishing separate completion of vertical well or segregated completion of horizontal well, replacing the wellbore with the supercritical carbon dioxide with a pressure higher than the strata pressure and lower than the formation fracturing pressure, and measuring the pressure drop and the suction capability.

Figure 2:
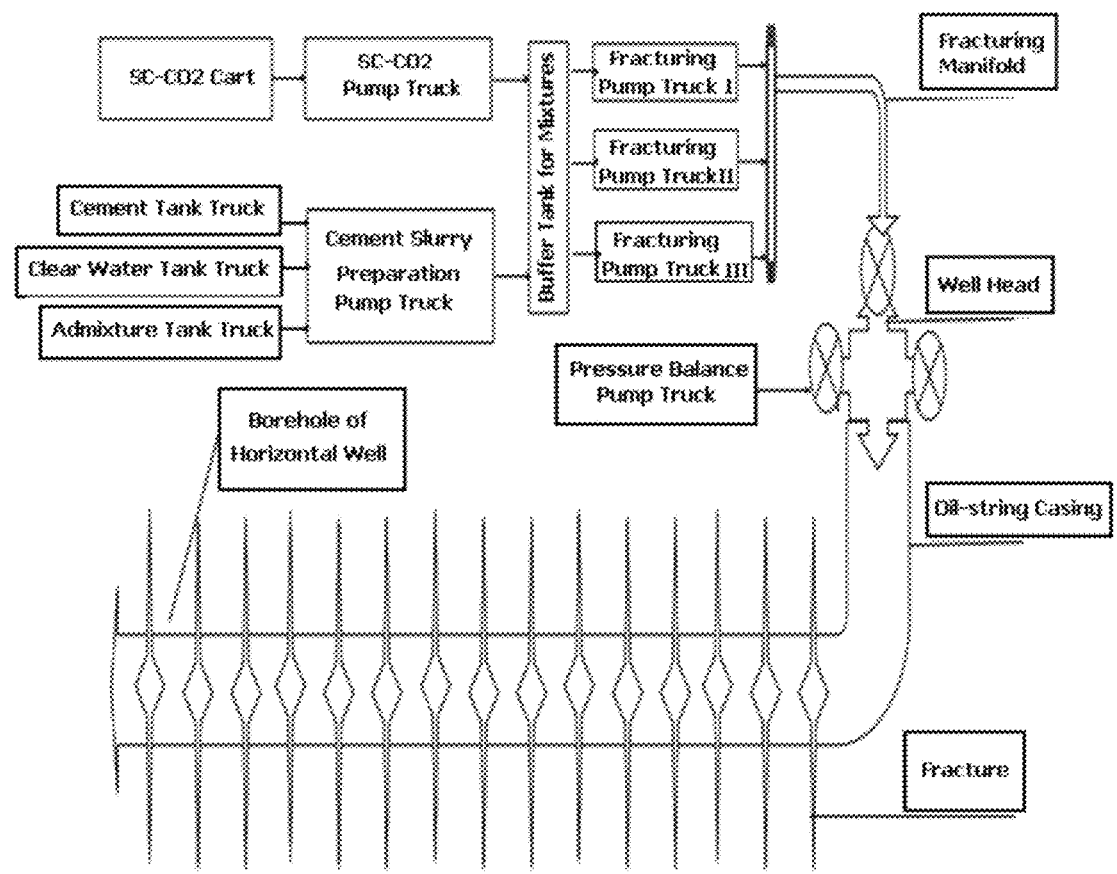
FIG. 2 is a schematic illustration of the process of conducting permeable cement stone fracturing for non-conventional oil and gas layer at the well site and underground.

The second step: mixing injection of the cement slurry and the supercritical carbon dioxide: conducting preparation and installation work according to the process of the permeable cement stone for fracturing the non-conventional oil and gas layer shown in FIG. 2 at the well site and under the ground; injecting the second mixture of the supercritical carbon dioxide and the cement slurry into the strata for fracturing to form reticulate artificial fracture at the actual proportion, temperature, displacement and having a pressure higher than formation fracturing pressure designed for a single well.

The third step: single injection of supercritical carbon dioxide for replacement: pumping the supercritical carbon dioxide according an earlier design, injecting the second mixture in to the fractures of the strata to entirely fill the strata fracture. Repeating the second step and the third step. After mixing and injecting of the mixture of the cement slurry and the supercritical dioxide into the fracture of the layers of vertical well and the segments of horizontal well is finished, closing the well while maintaining the pressure of the well.

The fourth step: gasification and solidification: according to the specific states of the single oil and gas well, closing the well before the initial setting time of the cement slurry designed though an experiment on the ground; allowing the cement slurry to solidify and the supercritical dioxide to gasify naturally until the cement slurry finally sets and reaches 80% of the designed strength; lowering the back pressure of well head in a controlled way using a small nozzle selected in the design to not only prevent the cement stone from being destroyed by the large pressure difference at the bottom of the well but also to allow the oil and gas to pass through the pore spaces of the cement stone in the artificial fracture and flow to the wellbore, increasing the positive permeability and further increasing the stimulation effect.

The fifth step: exhaustion after fracturing: when the strength of the cement stone in the fracture of the strata reaches 100% of the designed strength, conducting an air exhaustion by increasing the pressure difference at the bottom of the well using a larger nozzle selected in the design to further dredge and clean the fracture and the wellbore.

The sixth step: self-flowing production: when the exhaustion is finished, selecting the non-conventional oil and gas layer such as tight oil and gas, shale gas, coal-bed gas, etc. with high formation pressure, high formation temperature and has the characteristics of self-flowing, self decomposition and self-gasification; keeping the selected non-conventional oil and gas layer in this step flowing and adjusting the nozzle to the best status, thereafter allowing the production system to conduct normal production of oil or gas until the self-flowing is stopped.

The seventh step: cyclic steam stimulation: when the exhaustion is finished, selecting the non-conventional oil and gas layer such as tight oil and gas, shale gas, coal-bed gas, combustible ice, etc. with low formation pressure, low formation temperature and has no self gasification and no self decomposition and precipitation; injecting high-temperature carbon dioxide at a pressure higher than the inlet pressure of the strata, thereafter soaking to raise the temperature and gasify the carbon dioxide, conducting flowing after decomposition and precipitation, adjusting the nozzle to the best status, thereafter allowing the production system to conduct normal production of gas. Several rounds of cyclic steam stimulation can be conducted for gas production until the production is stopped.

The eighth step: gas lifting oil production: conducting oil and gas production by supplementing gas lift draining to the non-conventional oil and gas layer that has entered in a stage of low pressure, high water content, and inability to self-flow.

Although the invention has been described in terms of what is presently considered to be the most preferred embodiments, but while the person skilled in the art get to know the basic inventiveness point, modification and variation of these embodiments could be made. Therefore, attached claims should be explained to contain all the embodiments and all the modifications and variations fallen into the scope of the present invention.

Obviously, the person skilled in the art can make modifications and variations within the scope of the present invention. So, if these modifications and variations are still in the scope of the claims and technical equal to that of the claims, these modifications and variations should be contained in the present invention.

What is claimed is:

1. A permeable cement stone fracturing exploitation method for a non-conventional oil and gas layer, comprising following complementary processes:

transporting a supercritical carbon dioxide to a well site by using a specialized tanker truck or a pipeline; storing the supercritical carbon dioxide at the well site; and pumping and transporting the supercritical carbon dioxide by using one or more supercritical carbon dioxide pumps;

selecting an oil well cement and admixtures compatible with a well depth, a well temperature, and a strata;

transporting the oil well cement and the admixtures to the well site and storing the oil well cement and the admixtures at the well site;

mixing the oil well cement and the admixtures into a first mixture and pumping the first mixture by using one or more pumps, wherein the admixtures comprise a coagulation controlling agent, a viscosity controlling agent, a resistance reducing agent, and a filtrate reducing agent; forming a cement slurry:

pumping the supercritical carbon dioxide and the cement slurry respectively into a high pressure mixer at a proportion designed for a single well; automatically mixing the supercritical carbon dioxide and the cement slurry into a second mixture by the high pressure mixer; and continuously on-line monitoring and temporarily storing the second mixture; controlling a temperature, an output volume, and a pump pressure according to a design of the single well;

injecting the second mixture into the non-conventional oil and gas layer under a ground for fracturing by using a plurality of fracturing pumps to form a reticulate artificial fracture; wherein the supercritical carbon dioxide is heated by automatic heat exchange according to a temperatures of the strata so that the supercritical carbon dioxide is gasified into compressed carbon dioxide bubbles; an internal pressure of the cement slurry automatically decreases when the cement slurry enters a state of weightlessness during initial setting, therefore causing the compressed carbon dioxide bubbles to become air pores;

after final setting and solidification of the cement slurry, therefore forming a cement stone, using a portion of the carbon dioxide dissolved in bound water and free water to form a carbonic acid, wherein the carbonic acid erodes, dissolves and leaches the cement stone, so that a porosity and a permeability of the cement stone are further increased under the effect of the carbonic acid.

2. The method according to claim 1, wherein a critical condition of the supercritical carbon dioxide comprises a pressure higher than 7.38 Mpa and a temperature lower than 31.05° C.

* * * * *